US012735239B2

(12) United States Patent
Liao et al.

(10) Patent No.: US 12,735,239 B2
(45) Date of Patent: Sep. 15, 2026

(54) PACKING BAG AND AUTOMATED PRODUCTION APPARATUS

(71) Applicant: CHIENFU WRAPPING MATERIALS CO., LTD., Taichung City (TW)

(72) Inventors: Jun-Hao Liao, Taichung City (TW); Hsuan-Fu Huang, Taipei City (TW)

(73) Assignee: CHIENFU WRAPPING MATERIALS CO., LTD., Taichung City (TW)

( * ) Notice: Subject to any disclaimer, the term of this patent is extended or adjusted under 35 U.S.C. 154(b) by 0 days.

(21) Appl. No.: 18/809,347

(22) Filed: Aug. 20, 2024

(65) Prior Publication Data

US 2025/0066098 A1 Feb. 27, 2025

(30) Foreign Application Priority Data

Aug. 21, 2023 (TW) ................................ 112131380
Aug. 19, 2024 (TW) ................................ 113131174

(51) Int. Cl.
*B65D 81/05* (2006.01)
*B31D 5/00* (2017.01)

(52) U.S. Cl.
CPC ......... *B65D 81/052* (2013.01); *B31D 5/0073* (2013.01)

(58) Field of Classification Search
CPC ...... B65D 81/052; B65D 81/03; B65D 75/58; B65D 75/04; B65D 81/022; B65D 31/45; B65D 2203/02; B65D 75/56; B65B 55/20; B31D 5/0073
USPC ...................................... 383/3; 206/522, 521
See application file for complete search history.

(56) References Cited

U.S. PATENT DOCUMENTS 9,623,622 B2 * 4/2017 Baines ................. B65D 81/052
2005/0109656 A1 * 5/2005 Ishizaki ................. B65D 81/03 206/521
2022/0340351 A1 * 10/2022 Wehrmann ............. B65D 81/03

* cited by examiner

*Primary Examiner* — King M Chu
(74) *Attorney, Agent, or Firm* — Apex Juris, pllc; Hilde M. L. Coeckx

(57) ABSTRACT

The invention discloses an automatic production equipment, which includes a folding part, a pair of opening parts, a transverse sealing part and a vertical sealing part. An opening is defined between a first edge of a film layer and a second edge of the film layer, and the pair of opening parts open the opening between the first edge of the film layer and the second edge of the film layer for an object to be inserted through the opening. The transverse sealing portion forms a first transverse heat-sealing edge and a second transverse heat-sealing edge on the folded film layer, and the vertical sealing part forms a vertical heat-sealing edge on the folded film layer.

8 Claims, 16 Drawing Sheets

PACKING BAG AND AUTOMATED PRODUCTION APPARATUS

BACKGROUND OF THE DISCLOSURE

1. Field of the Disclosure

The present invention relates generally to a packing bag and an automated production apparatus, and more particularly to a packing bag adapted to mass production and an automated production apparatus for producing the same.

2. Description of the Prior Art

Recently, packing bags with airbags can be inflated right before packaging contents, allowing the inflated airbags to provide cushioning performance to protect the contents inside the packing bag. This is particularly useful for packaging e-commerce products, as the cushioning effect of the airbags prevents damage from impacts during transportation. However, conventionally, the contents are manually placed into the packing bags with inflated airbags, and the inflated airbags will compress the internal space of the packing bags, which increases the time required to insert the items into the packing bags with inflated airbags.

In addition, due to the rapid development of electronic consumption and the increasing volume of logistics flow, the packing bags that protect products or documents lack traceability features and anti-theft measures, which is one of the main issues faced by the industry.

SUMMARY OF THE DISCLOSURE

The present invention provides a packing bag adapted to mass production and capable of protecting products or documents lack traceability features and anti-theft measures and an automated production apparatus for producing the same for solving the above drawbacks.

For solving the above drawbacks, the present invention provides a packing bag including a film layer and at least one airbag. The film layer has a first transverse sealing edge, a second transverse sealing edge, a longitudinal sealing edge and a folding line. The film layer is folded along the folding line; the longitudinal sealing edge is opposite to the folding line; the first transverse sealing edge is connected to the longitudinal sealing edge and the folding line; the second transverse sealing edge is connected to the longitudinal sealing edge and the folding line and opposite to the first transverse sealing edge. The first transverse sealing edge, the second transverse sealing edge, the longitudinal sealing edge and the folding line collectively form an accommodating space, and the accommodating space is for accommodating an object. The at least one airbag is disposed on the film layer and transitions from a flat state to an inflated state by being inflated.

According to an embodiment, the film layer further has a first film edge and a second film edge. After the film layer is folded along the folding line, the first film edge is corresponding to the second film edge and the first film edge and the second film edge define an opening. The longitudinal sealing edge is for sealing the first film edge and the second film edge, so as to seal the opening.

According to an embodiment, the first transverse sealing edge of the film layer is formed by a transverse sealing portion; the object enters the accommodating space through the opening; a part of the film layer near the first transverse sealing edge is driven by an activation mechanism when the object enters the accommodating space, such that the first film edge and the second film edge are collectively formed the longitudinal sealing edge by a longitudinal scaling portion.

According to an embodiment, the packing bag further includes an outfit layer. The outfit layer covers the film layer and has a first outfit edge and a second outfit edge; two sides of the outfit layer are respectively combined with the first transverse sealing edge and the second transverse sealing edge of the film layer. The outfit layer and the film layer are collectively folded by the folding line, such that the first outfit edge and the second outfit edge of the outfit layer are combined with the longitudinal sealing edge.

According to an embodiment, the film layer has a film outer surface and a film inner surface, the film inner surface defines the accommodating space; the film outer surface and the film inner surface are respectively located on opposite sides of the film layer. The outfit layer has an outfit outer surface and an outfit inner surface; the outfit outer surface faces the film inner surface; the outfit outer surface and the outfit inner surface are located on opposite sides of the outfit layer. The packing bag further includes an identification component selectively disposed at least one of on the film outer surface, on the film inner surface, in the accommodating space, on the outfit outer surface, on the outfit inner surface, between the outfit inner surface and the film outer surface and on the object; the identification component is for providing an identification message.

According to an embodiment, the film layer has a film outer surface and a film inner surface; the film inner surface defines the accommodating space; the film outer surface and the film inner surface are respectively located on opposite sides of the film layer. The packing bag further includes an identification component selectively disposed at least one of on the film outer surface, on the film inner surface, in the accommodating space and on the object; the identification component is for providing an identification message.

For solving the above drawbacks, the present invention further provides an automated production apparatus for producing a packing bag. The packing bag includes a film layer; the film layer has a first film edge and a second film edge. The automated production apparatus includes a folding member and an opening member. The folding member is for folding the film layer along a folding line, such that the second film edge facing the first film edge, and an opening is defined between the first film edge and the second film edge. The opening member is for opening the opening between the first film edge and the second film edge allowing an object to enter the opening.

According to an embodiment, the automated production apparatus further includes a transverse sealing portion and a longitudinal sealing portion. The transverse scaling portion is for forming a first transverse sealing edge and a second transverse sealing portion of the film layer after being folded; the longitudinal sealing portion is for a longitudinal sealing edge of the film layer after being folded.

According to an embodiment, the automated production apparatus further includes an activation mechanism for driving a part of the film layer near the first transverse sealing edge when the object enters the accommodating space, such that the first film edge and the second film edge are collectively formed the longitudinal sealing edge by the longitudinal sealing portion.

According to an embodiment, the transverse sealing portion is connected to the longitudinal sealing portion, such that the transverse sealing portion and the longitudinal sealing portion are collectively formed a L-shaped structure.

According to an embodiment, the transverse sealing portion is not connected to the longitudinal sealing portion.

For solving the above drawbacks, the present invention further provides a packing bag including a film layer and at least one airbag. The film layer has a first transverse sealing edge, a second transverse sealing edge, a longitudinal lug sealing edge, a first folding portion and a second folding portion. The first transverse sealing edge is opposite to the second transverse sealing edge; the first folding portion is opposite to the second folding portion. The longitudinal lug sealing edge is connected to the first transverse sealing edge and the second transverse sealing edge, and located between the first folding portion and the second folding portion; the first transverse sealing edge, the second transverse sealing edge, the longitudinal lug sealing edge, the first folding portion and the second folding portion are collectively forming an accommodating space; the accommodating space is for accommodating an object. The at least one airbag is disposed on the film layer and transitions from a flat state to an inflated state by being inflated.

According to an embodiment, the packing bag further includes an outfit layer covering the film layer; the outfit layer has a first outfit edge and a second outfit edge; the outfit layer and the film layer are folded along the first folding portion and the second folding portion, such that the first outfit edge and the second outfit layer are combined with the longitudinal lug sealing edge.

For solving the above drawbacks, the present invention further provides an automated production apparatus for producing a packing bag. The packing bag includes a film layer; the film layer has a first film edge and a second film edge. The automated production apparatus includes a folding member including a closing portion, a first collapse wing portion and a second collapse wing portion. The first collapse wing portion is connected to a side of the closing portion; the second collapse wing portion connected to another side opposite to the first collapse wing portion of the closing portion. When the film layer passes through the folding member, the first collapse wing portion makes the film layer to form a first folding portion; the second collapse wing portion makes the film layer to form a second folding portion; the closing portion makes the film layer to form an accommodating space and to close the first film edge and the second film edge.

According to an embodiment, the automated production apparatus further includes a longitudinal sealing portion and a transverse sealing portion. The longitudinal sealing portion is for sealing the closed first film edge and the second film edge, so as to form a longitudinal lug sealing edge of the film layer; the transverse sealing portion is for forming a first transverse sealing edge and a second transverse sealing edge of the film layer after the longitudinal sealing portion seals the closed first film edge and the second film edge.

In summary, the folding member of the automated production apparatus of the present invention folds the film layer along the folding line, defining the opening between the second film edge and the first film edge. The opening member of the automated production apparatus of the present invention opens the opening between the second film edge and the first film edge to allow the object to be placed through the opening. The transverse sealing portion of the automated production apparatus of the present invention forms the first transverse sealing edge and the second transverse sealing edge on the film layer after being folded. Additionally, the longitudinal sealing portion of the automated production apparatus of the present invention forms the longitudinal sealing edge on the film layer after being folded. In this way, the invention utilizes the automated production apparatus for the automatically packaging of the object, saving packaging time. Furthermore, the packaging bag of the present invention may have an identification component, which can be used to provide an identification message, allowing the packing bag to be identified, tracked, and counted during the logistics process, or to generate anti-theft functionality.

BRIEF DESCRIPTION OF THE DRAWINGS

The present invention will be best understood by referring to the following detailed description of one illustrative embodiment in conjunction with the accompanying drawings, in which.

DETAILED DESCRIPTION

To facilitate understanding of the present invention for those skilled in the art, multiple embodiments of the present invention will be explained below, along with the drawings which illustrate the composition of the present invention and the intended effect to be achieved in detail. It should be noted that, in order to provide a more straightforward description of the basic structure or method of the implementation of the present invention, the accompanying drawings are simplified schematic views and, therefore, only show components and combinations relevant to the present invention. The actual components, layouts, and arrangements may be more complicated. In addition, for the sake of illustration, the components shown in each of the accompanying drawings of the present invention are not drawn to exact scale with the actual number, shape, and size they are in practical implementations, and their actual scale may be adjusted as required.

The directional terms, such as "up", "down", "left", "right", "front", and "rear", mentioned in the following embodiments simply indicate the directions in the accompanying drawings. Therefore, the directional terms used in the descriptions of the present invention are for illustrative purposes, and are not limitations of the present invention. Though the wordings "first", "second", "third", etc., can be used to indicate multiple components, the components are not limited by these terms. Such wordings are merely used for distinguishing one component from other components in the specification. Following the sequence of being recited, the language in claims may use different orderings to describe the same components. In other words, a "first some component" mentioned in the following descriptions may be a "second some component" in the claims.

Figure 1:
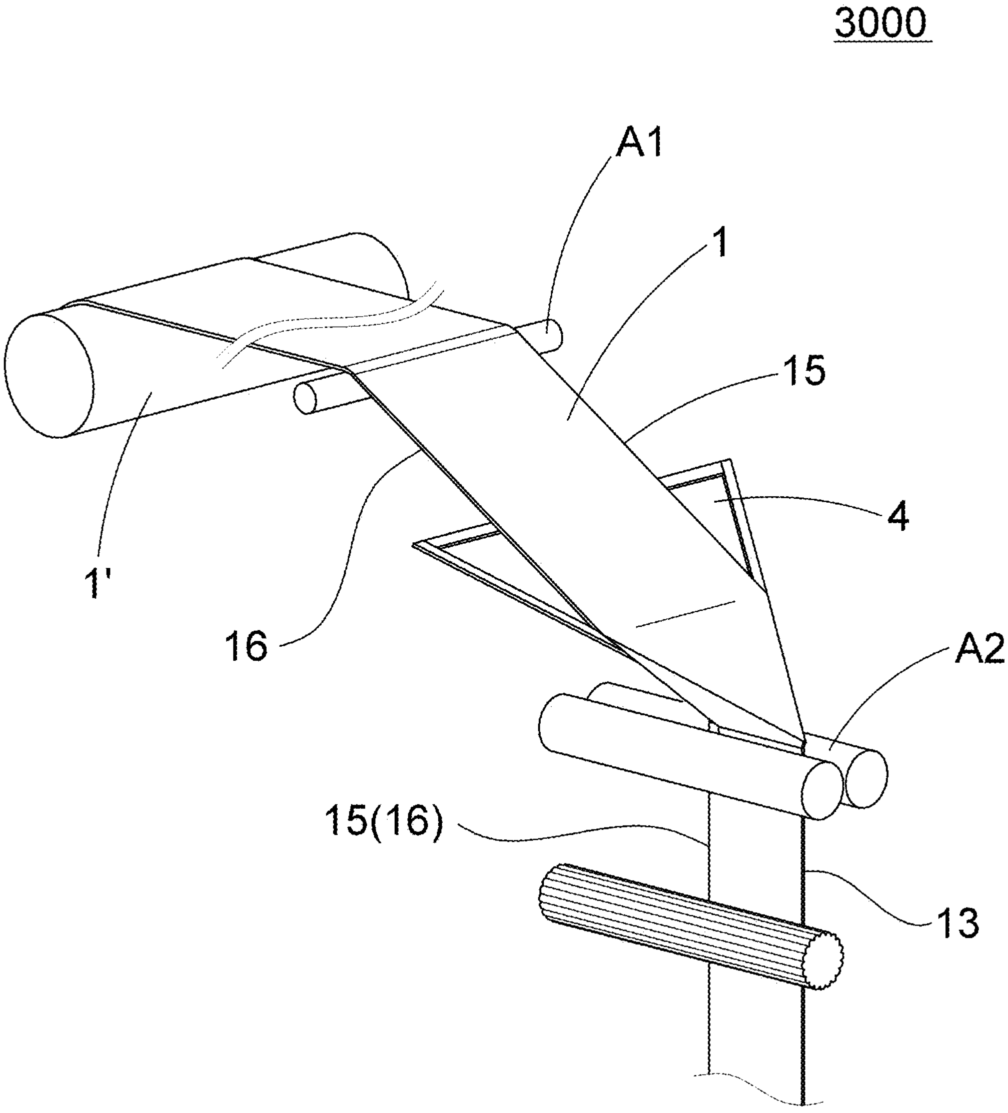
FIG. 1 is a schematic diagram of an automated production apparatus in a folding stage according to an embodiment of the present invention.
Figure 2:
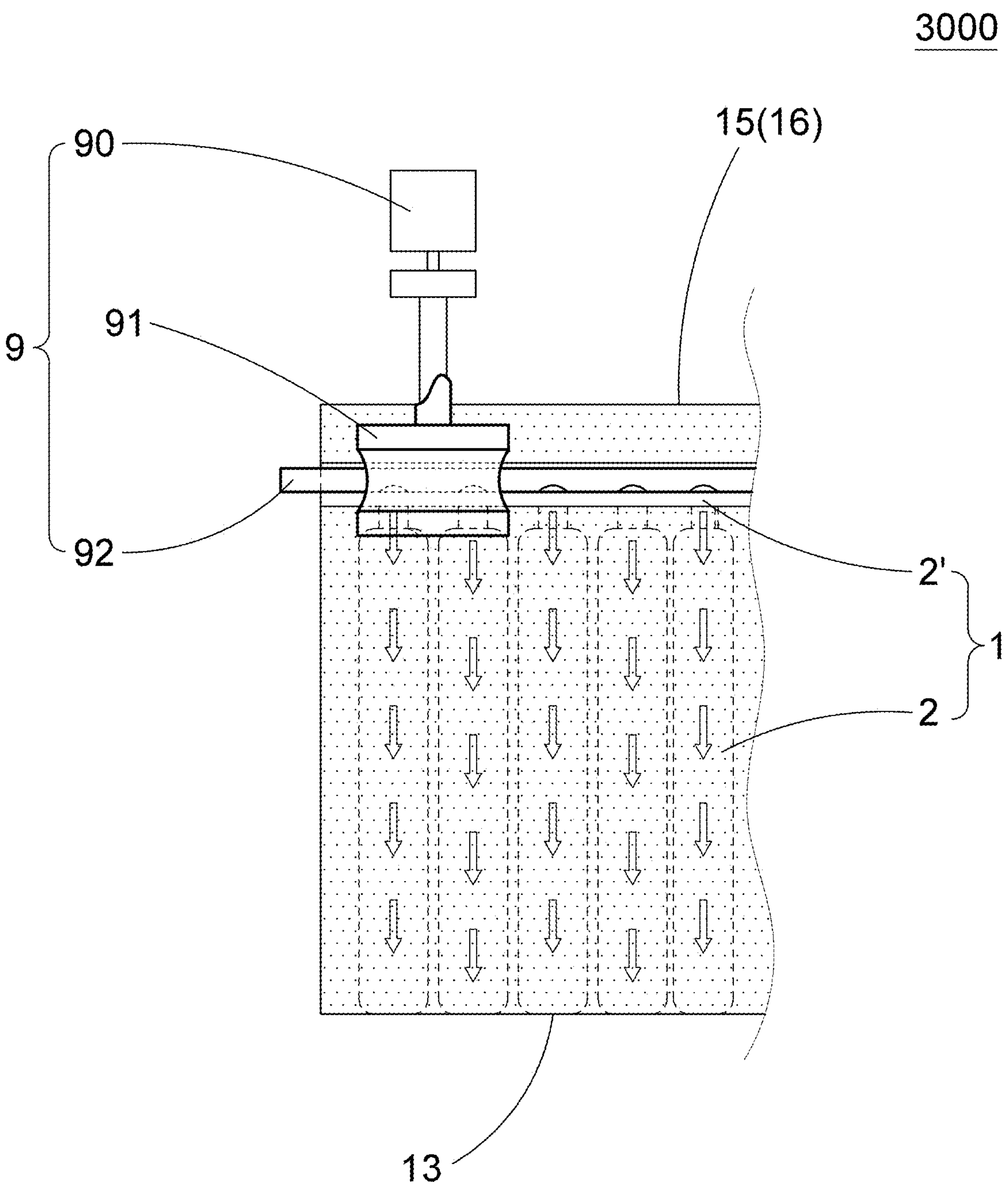
FIG. 2 is a schematic diagram of the automated production apparatus in an inflated stage according to the embodiment of the present invention.
Figure 3:
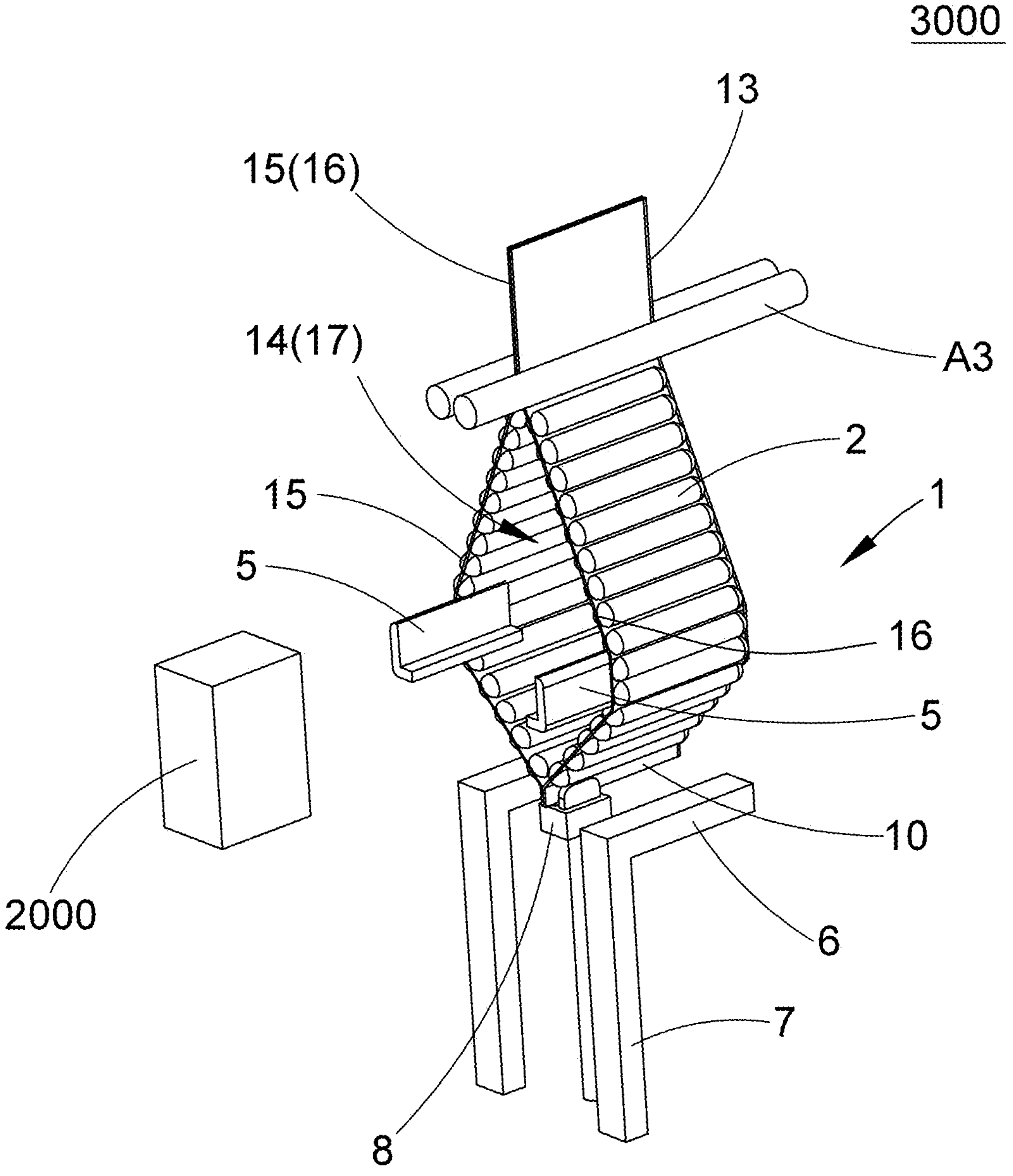
FIG. 3 is a schematic diagram of the automated production apparatus in a packaging stage according to the embodiment of the present invention.
Figure 4:
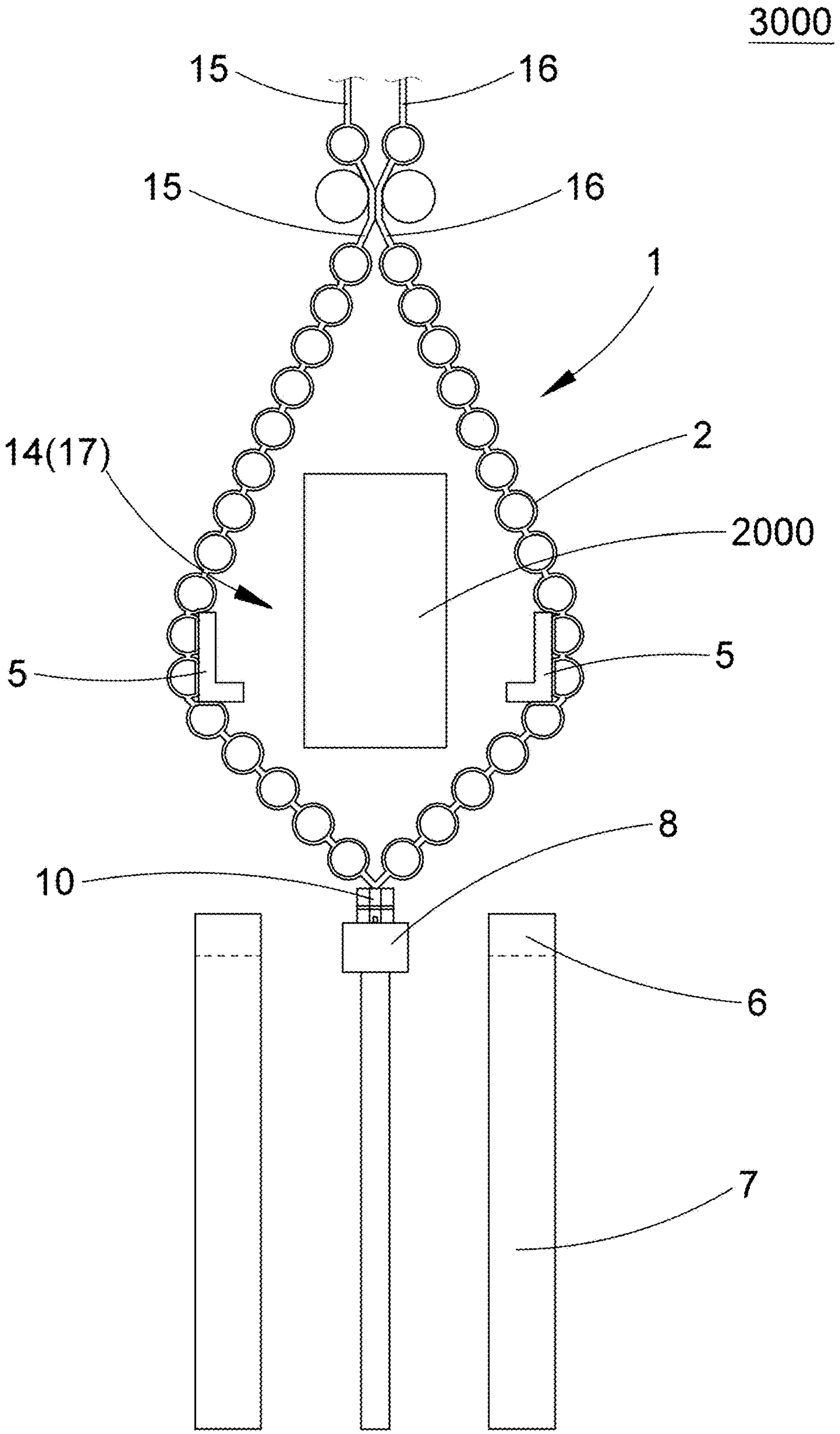
FIG. 4 is a front view of the automated production apparatus in the packaging stage according to the embodiment of the present invention.
Figure 5A:
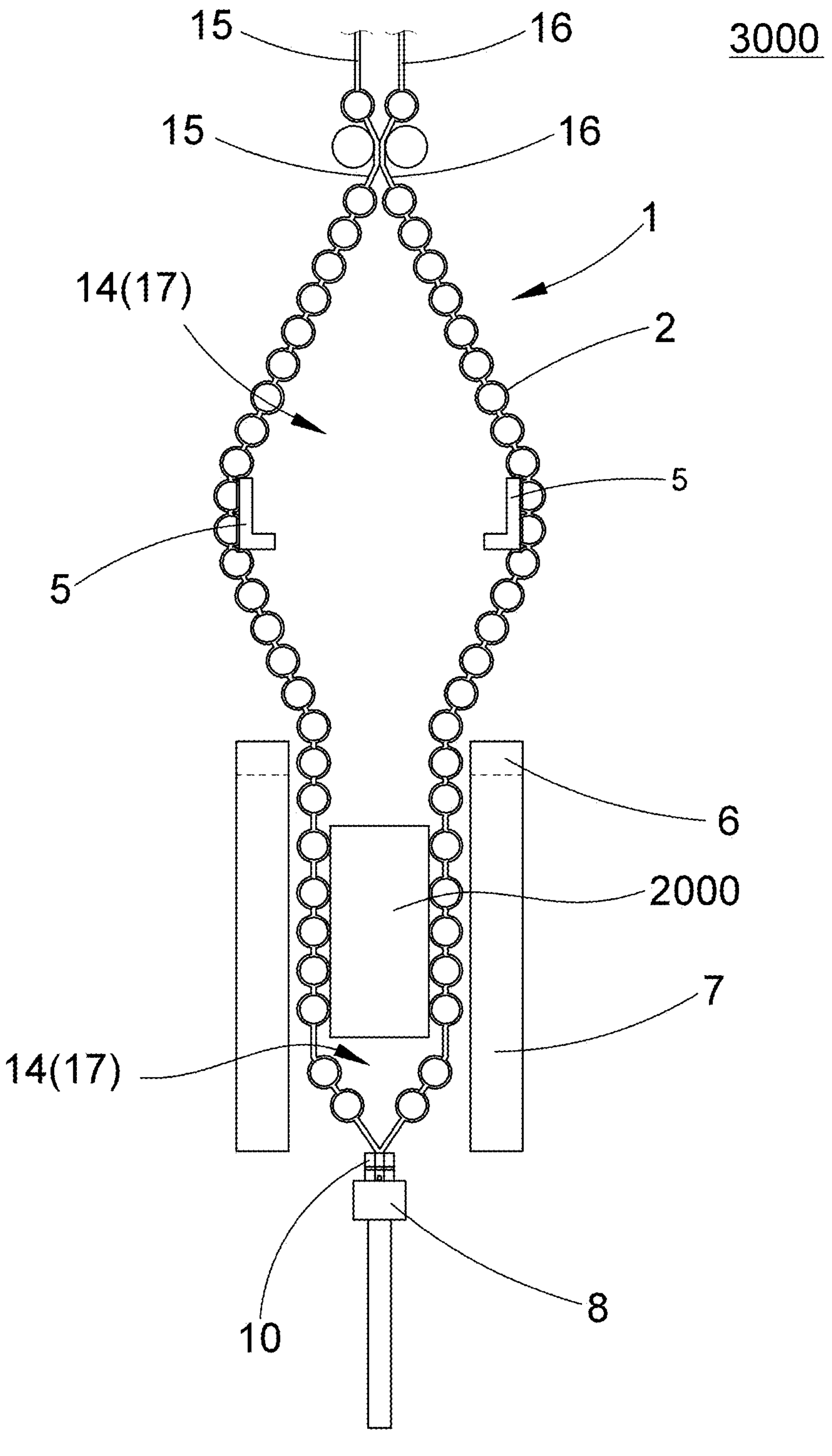
FIG. 5A is a front view of the automated production apparatus in a preheat sealing stage according to the embodiment of the present invention.
Figure 5B:
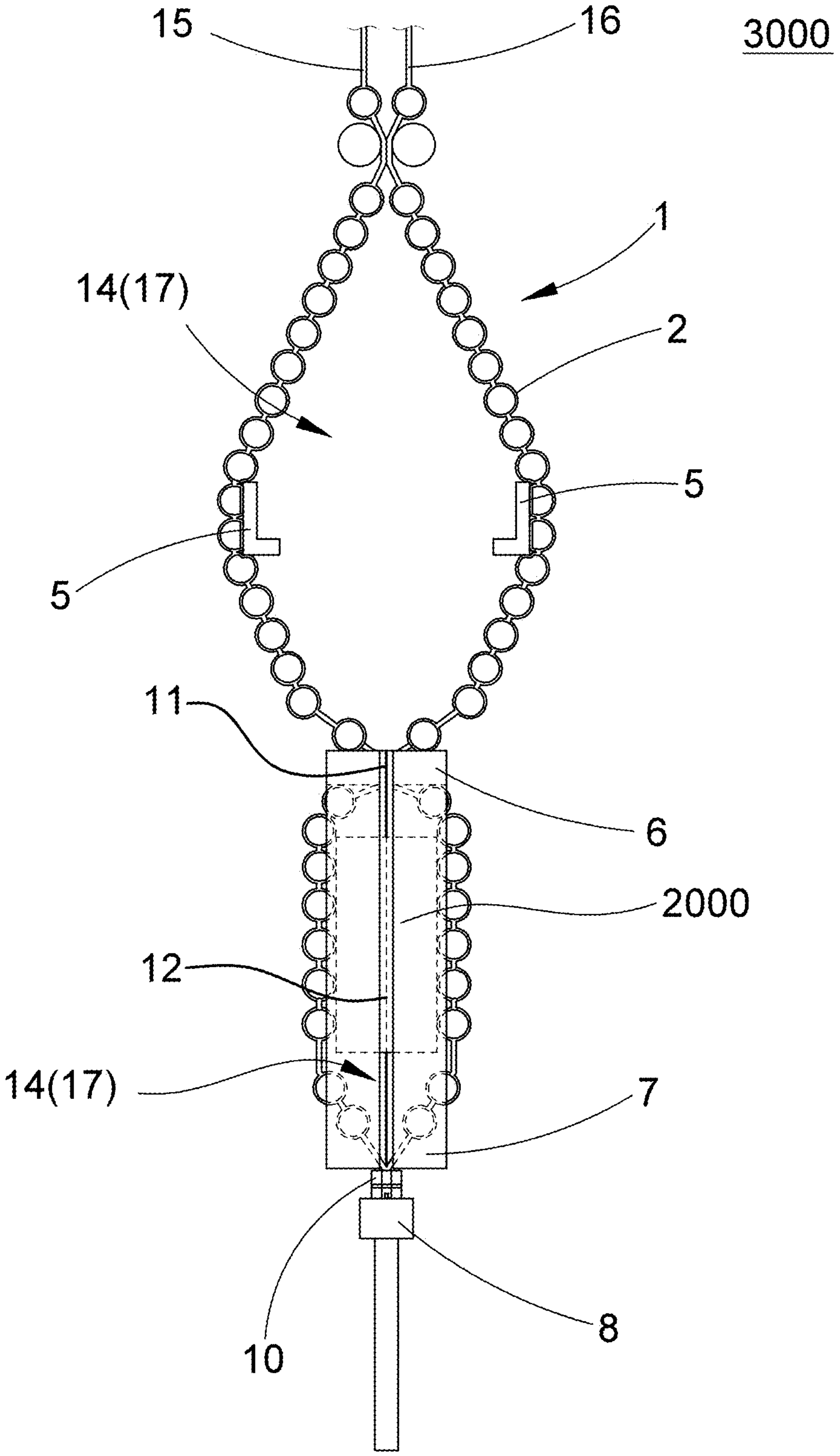
FIG. 5B is a front view of the automated production apparatus in a heat sealing stage according to the embodiment of the present invention.
Figure 6:
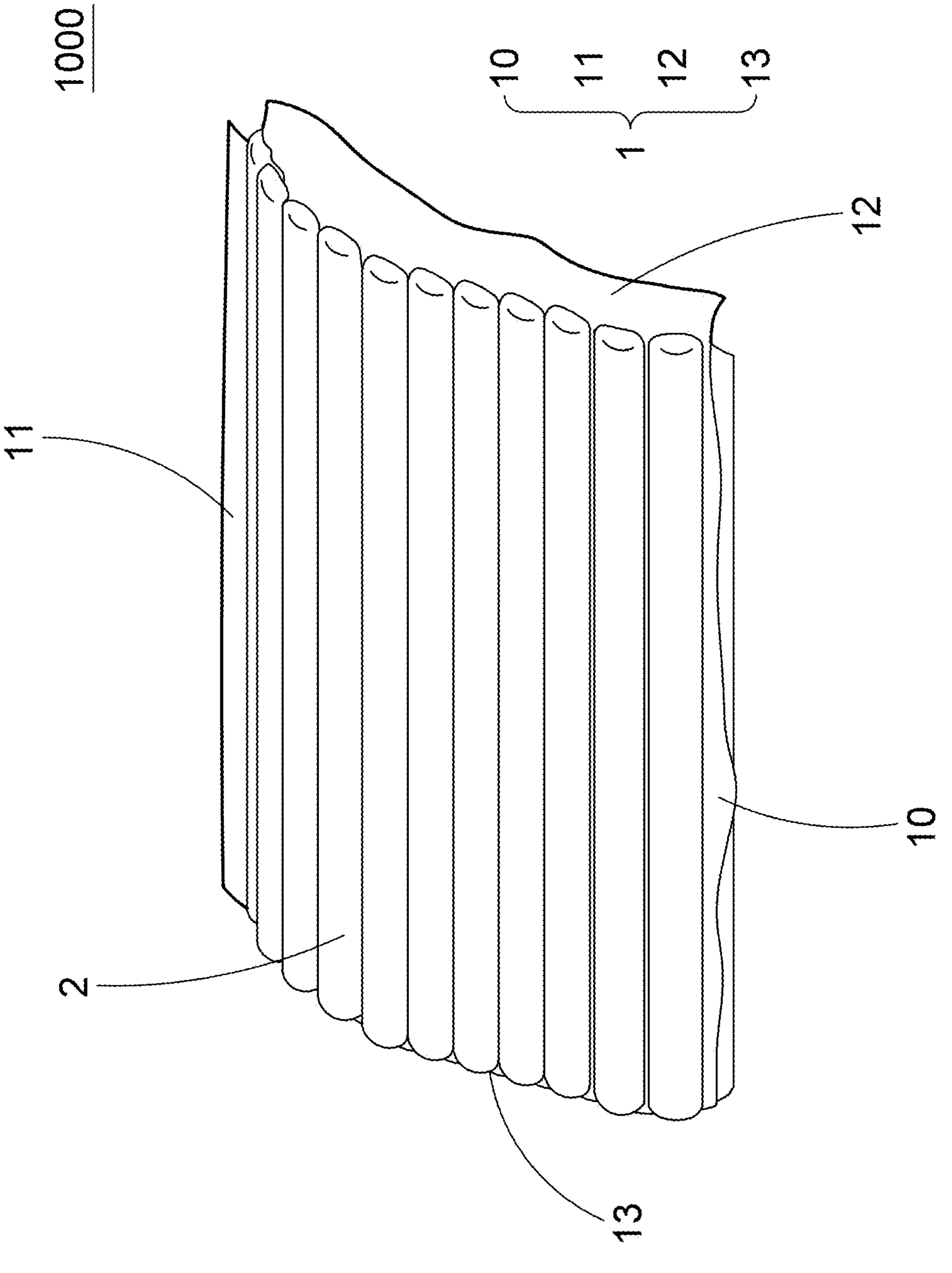
FIG. 6 is a schematic diagram of a packing bag according to a first embodiment of the present invention.

Please refer to FIG. 1 to FIG. 6. FIG. 1 is a schematic diagram of an automated production apparatus 3000 in a folding stage according to an embodiment of the present invention. FIG. 2 is a schematic diagram of the automated production apparatus 3000 in an inflated stage according to the embodiment of the present invention. FIG. 3 is a schematic diagram of the automated production apparatus 3000 in a packaging stage according to the embodiment of the present invention. FIG. 4 is a front view of the automated production apparatus 3000 in the packaging stage according to the embodiment of the present invention. FIG. 5A is a front view of the automated production apparatus 3000 in the preheat sealing stage according to the embodiment of the present invention. FIG. 5B is a front view of the automated production apparatus 3000 in the heat scaling stage according to the embodiment of the present invention. FIG. 6 is a schematic diagram of a packing bag 1000 according to the first embodiment of the present invention.

As shown in FIG. 1 to FIG. 6, the automated production apparatus 3000 of the present invention is used to produce the packing bag 1000, which includes a film layer 1. In this embodiment, the film layer 1 has at least one airbag 2 and an airflow channel 2'. The airflow channel 2' communicates with the at least one airbag 2 and is used to allow a gas to enter the at least one airbag 2, enabling the at least one airbag 2 to change from a flat state as shown in FIG. 2 to an inflated state as shown in FIG. 3. In this embodiment, the film layer 1 has multiple airbags 2; however, the present invention is not limited thereto, e.g., the film layer 1 may also have one airbag 2, depending on practical demands. In other embodiments, the film layer 1 may also contain multiple bubbles, meaning the film layer 1 can also be a bubble film, depending on practical demands.

The film layer 1 has a first film edge 15 and a second film edge 16. The automated production apparatus 3000 includes a folding member 4, an opening member 5, a transverse sealing portion 6, a longitudinal sealing portion 7, and an activation mechanism 8. As shown in FIG. 1, the film layer 1 is drawn from a film material roll 1' and transported to the folding member 4 by a first roller set A1. The folding member 4 is a triangular component, and as the film layer 1 is transported through this triangular component (i.e., the folding member 4) by a second roller set A1, the triangular component (i.e., the folding member 4) can fold the film layer 1 along a folding line 13, causing the second film edge 16 to be opposite to the first film edge 15. At this point, the second film edge 16 and the first film edge 15, which are folded and opposite each other by the triangular component (i.e., the folding member 4), define an opening 17 and an accommodating space 14 that communicates with the opening 17.

As shown in FIG. 2, the automated production apparatus 3000 may include an inflated equipment 9, which includes a motor 90, a driving roller 91, and an air inlet 92. The motor 90 is coupled to the driving roller 91 and is used to provide power to the driving roller 91, enabling the driving roller 91 to move the film layer 1. Due to the perspective, FIG. 2 only shows one driving roller 91; however, in practice, those skilled in the art will understand that the driving roller 91 is composed of a pair of upper and lower rollers that work together to drive the film layer 1 through their clamping action.

The air inlet 92 is installed within the airflow channel 2' and is used to expel the gas. When the gas expelled from the air inlet 92 enters the airbag 2, the airbag 2 can change from the flat state to the inflated state. The detailed technical specifications of the inflated equipment 9 mentioned in this embodiment can be referred to the application with Taiwan Patent Application No. 112115425, and will not be reiterated here.

As shown in FIG. 3, after the film layer 1 has the gas filled into the airbag 2 through the air inlet 92 of the inflated equipment 9, the film layer 1, along with the airbag 2 in the inflated state, is further transported by a third roller set A3 through the opening member 5. During the process of the film layer 1 after being folded passing through the opening member 5, the first film edge 15 and the second film edge 16, which are opposite to each other in the folded state, can each be guided by the opening member 5 in directions that separate them. In this way, the opening 17 of the film layer 1 which is originally in a folded state, can be opened by the opening member 5. At this point, the opened opening 17 can allow an object 2000 to be placed into the accommodating space 14 of the film layer 1.

In this embodiment, the number of opening members 5 can be two, positioned opposite each other; however, the invention is not limited thereto. For example, the opening member 5 could also be a base, which has a bottom plate and two protruding ribs that extend from the bottom plate. In this way, during the process of the folded film layer 1 passing through this base (i.e., opening member 5), the first film edge 15 and the second film edge 16, which are opposite each other in the folded state, can each be guided by the two protruding ribs of the base in directions that separate them, thereby opening the opening 17 of the originally folded film layer 1. At this point, the opened opening 17 can allow the object 2000 to be placed into the accommodating space 14 of the film layer 1.

The transverse sealing portion 6 is used to form a first transverse sealing edge 10 in the folded film layer 1. The first transverse sealing edge 10 not only provides a bottom support for object 2000, allowing object 2000 to be secured in the accommodating space 14 of film layer 1, but it also serves as a force application point for the activation mechanism 8, enabling the activation mechanism 8 to drive the movement of film layer 1. Furthermore, after the object 2000 is placed inside the accommodating space 14 of film layer 1 (as shown in FIG. 4), the activation mechanism 8 can be used to drive the film layer 1 near the first transverse sealing edge 10. In this embodiment, the activation mechanism 8 grips the first transverse sealing edge 10 to drive the film layer 1, thereby moving the film layer 1 along with the position of the object 2000 as shown in FIG. 4 to the position shown in FIG. 5.

When the film layer 1, along with object 2000, is driven by the activation mechanism 8 to the position shown in FIG. 5, the transverse sealing portion 6 and the longitudinal scaling portion 7 come together to seal the film layer 1. Consequently, the transverse sealing portion 6 will form a second transverse sealing edge 11 relative to the first transverse sealing edge 10, and the first film edge 15 and second film edge 16 of film layer 1 will form a longitudinal sealing edge 12 through the longitudinal scaling portion 7 (as shown in FIG. 5B and FIG. 6), thereby closing the opening 17. In this way, the folding line 13 formed by the folding member 4, the first transverse sealing edge 10 and second transverse sealing edge 11 created by the transverse sealing portion 6, and the longitudinal sealing edge 12 formed by the longitudinal sealing portion 7 work together to enclose the accommodating space 14 on all sides, packaging the object 2000 within the accommodating space 14 inside the film layer 1.

As shown in FIG. 3, FIG. 4, FIG. 5A, and FIG. 5B, the transverse scaling portion 6 and longitudinal sealing portion 7 are connected to form an L-shaped structure; however, the present invention is not limited thereto. For instance, the transverse scaling portion 6 may also be unconnected to the longitudinal sealing portion 7. Which one of the above-mentioned configurations to adopt depends on practical demands.

Figure 7:
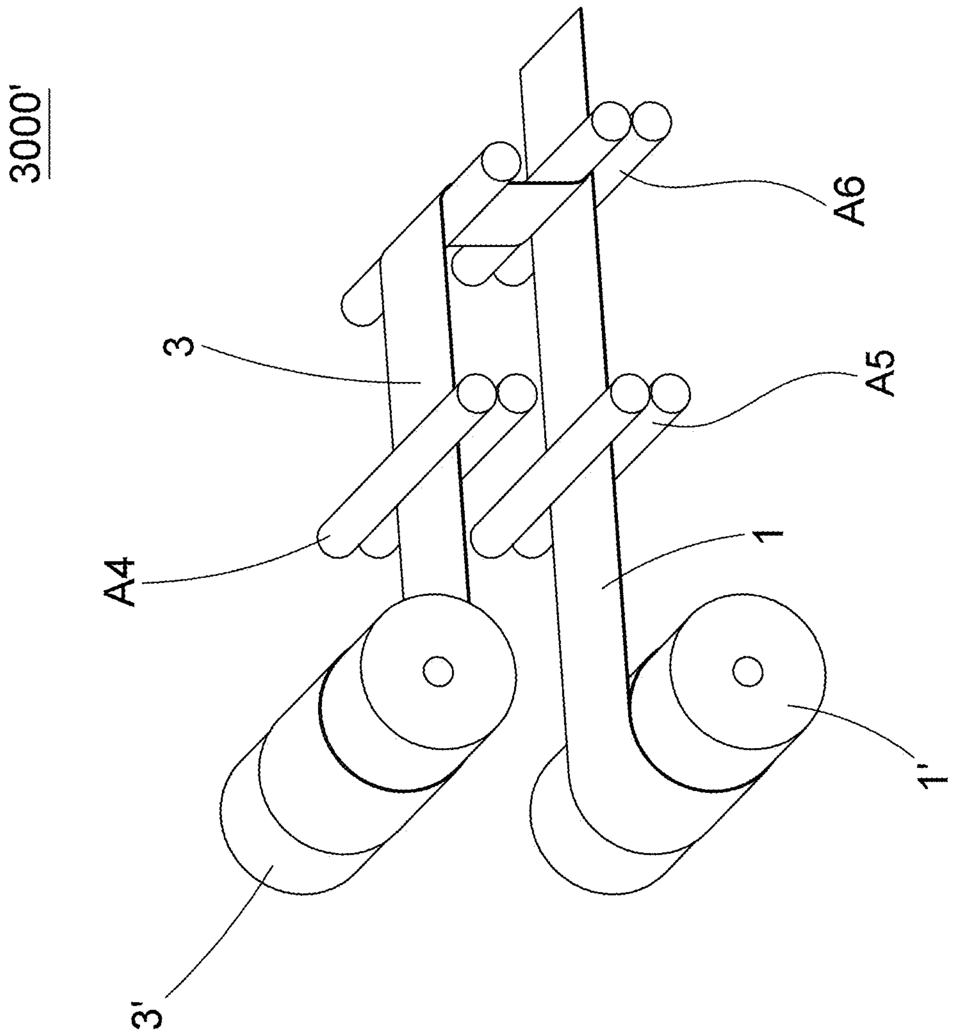
FIG. 7 is a schematic view of an automated production apparatus during a stacking phase according to another embodiment of the present invention.
Figure 8:
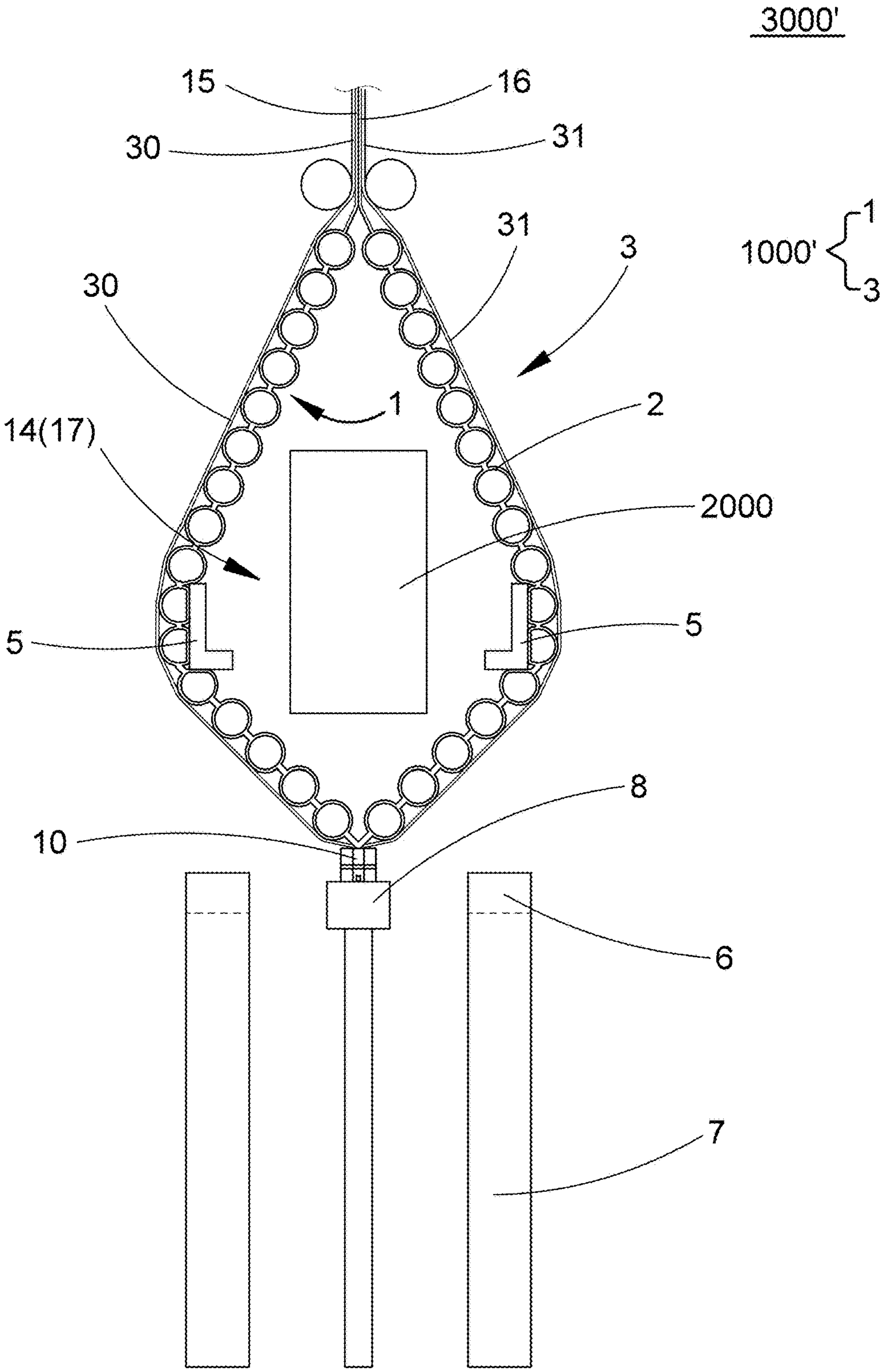
FIG. 8 is a front view of the automated production apparatus during a packaging phase according to another embodiment of the present invention.

Please refer to FIG. 7 and FIG. 8. FIG. 7 is a schematic view of an automated production apparatus 3000' during the stacking phase according to another embodiment of the present invention. FIG. 8 is a front view of the automated production apparatus 3000' during the packaging phase according to another embodiment of the present invention. Unlike the packing bag 1000 described above, the packing bag 1000' in this embodiment further includes an outfit layer 3, which covers the outer side of the film layer 1. The outfit layer 3 has a first outfit edge 30 and a second outfit edge 31. In the process, first, the outfit layer 3 is provided, which is drawn from an outfit material roll 3' and kept flat by passing through a material arranging roller set A4. Next, the outfit layer 3 is stacked on top of the film layer 1, which is drawn from a film material roll 1' and also kept flat by passing through a material arranging roller set A5. Thereafter, the outfit layer 3 and the film layer 1 pass simultaneously through a material collapse roller set A5, thereby completing the stacking of the outfit layer 3 with the film layer 1.

Similarly, the automated production apparatus 3000' also includes the opening member 5, the transverse sealing portion 6, the longitudinal scaling portion 7, and the activation mechanism 8. The operational principles related to the stacked outfit layer 3 and film layer 1 in the subsequent processes involving the opening member 5, the transverse sealing portion 6, the longitudinal sealing portion 7, and the activation mechanism 8 of the automated production apparatus 3000' are the same as those in the aforementioned embodiment where the film layer 1 interacts with the opening member 5, the transverse sealing portion 6, the longitudinal sealing portion 7, and the activation mechanism 8 of the automated production apparatus 3000. For the sake of brevity, these details will not be reiterated here. Thus, in this embodiment, the sides of the outfit layer 3 can be combined with the first transverse sealing edge 10 and the second transverse sealing edge 11 of the film layer 1, and the outfit layer 3 and the film layer 1 are jointly folded along the folding line 13, allowing the first outfit edge 30 and the second outfit edge 31 of the outfit layer 3 to merge with the longitudinal sealing edge 12 of the film layer 1. In other words, the packing bag of this embodiment includes the outfit layer 3 added to the outer side of the film layer 1, with the object 2000 packaged within the accommodating space 14, which is enclosed by the folding line 13, the first transverse sealing edge 10, the second transverse sealing edge 11, and the longitudinal sealing edge 12.

Figure 9:
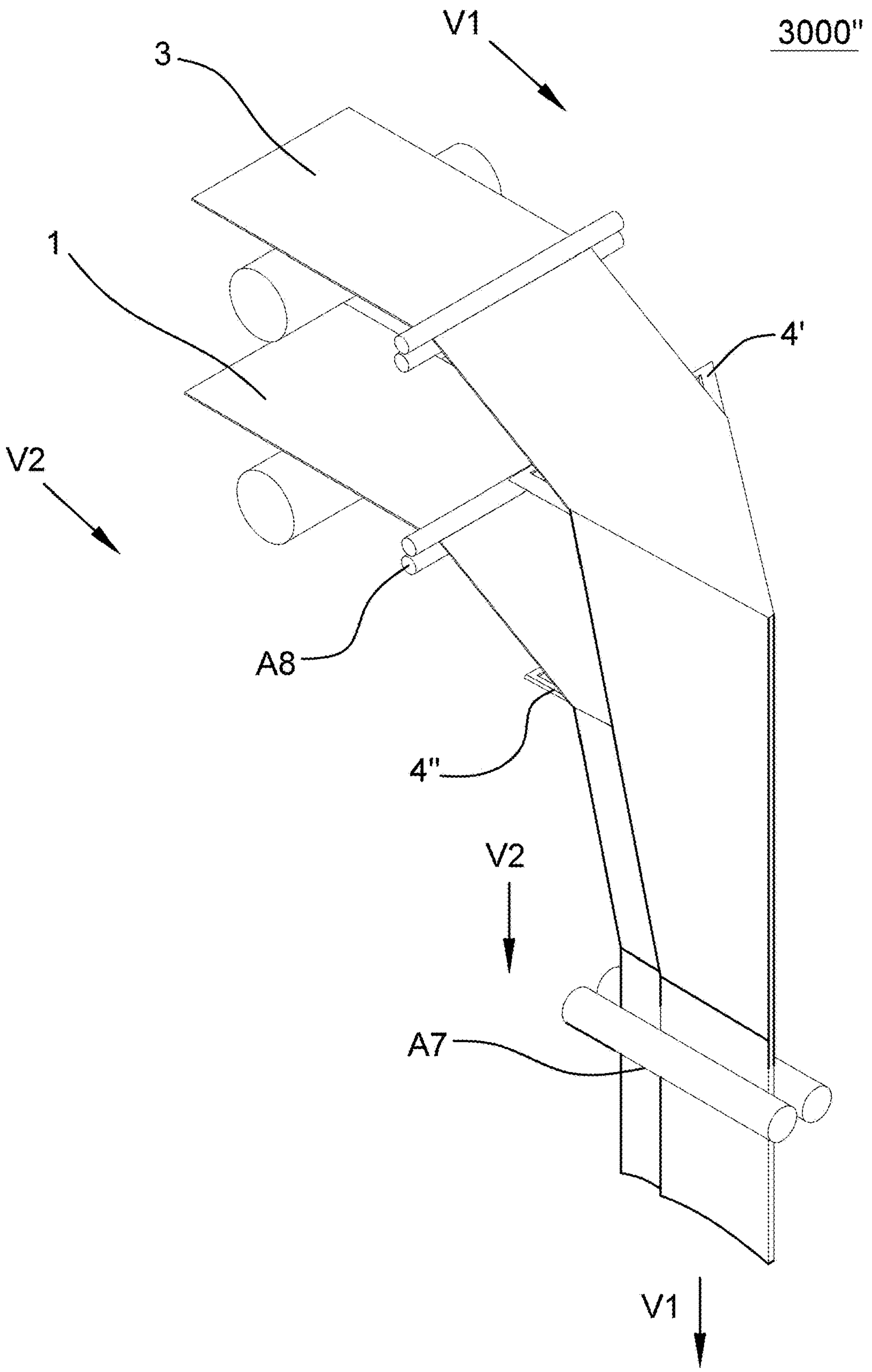
FIG. 9 is a schematic diagram of an automated production apparatus according to another embodiment of the present invention.
Figure 10:
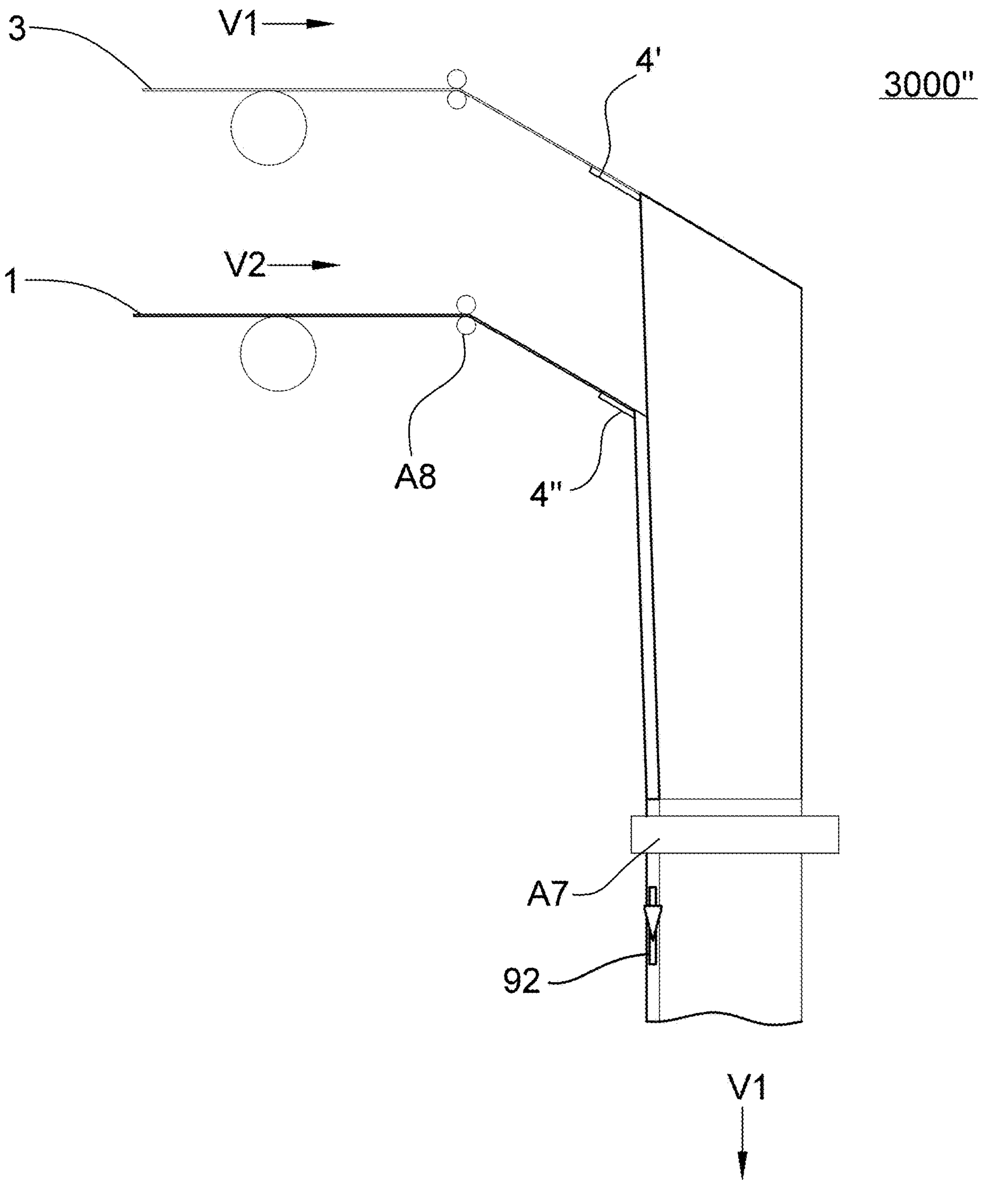
FIG. 10 is a side schematic view of the automated production apparatus according to another embodiment of the present invention.

Please refer to FIG. 9 and FIG. 10. FIG. 9 is a schematic diagram of an automated production apparatus 3000" according to another embodiment of the present invention. FIG. 10 is a side schematic view of the automated production apparatus 3000" according to another embodiment of the present invention. The automated production apparatus 3000" includes a first folding member 4', a second folding member 4", a first driving roller set A7, a second driving roller set A8, and an air inlet 92. The first driving roller set A7 drives the film layer 1, allowing it to pass through the first folding member 4' at a first linear velocity V1, with the film layer 1 being folded by the first folding member 4' as it passes through. The second driving roller set A8 drives the outfit layer 3, allowing it to pass through the second folding member 4" at a second linear velocity V2, with the outfit layer 3 being folded by the second folding member 4" as it passes through. The air inlet 92 is positioned before the transverse sealing portion 6 or the longitudinal sealing portion 7 and is used to inflate the film layer 1. The inflation process is the same as in the aforementioned embodiment, and will not be reiterated here.

It is worth mentioning that after the air inlet 92 inflates the film layer 1, the length of the film layer 1 in the direction of its movement (i.e., the length direction of the film layer 1) will shorten due to the expansion of the air bag. In this embodiment, the first linear velocity V1 of the outfit layer 3 driven by the first driving roller set A7 can be less than the second linear velocity V2 of the film layer 1 driven by the second driving roller set A8. The speed difference between the first linear velocity V1 and the second linear velocity V2 can compensate for the length difference between the film layer 1 and the outfit layer 3 caused by the shortening of the film layer 1 due to the inflation of the air bag. In other words, the difference between the first linear velocity V1 of the film layer 1 and the second linear velocity V2 of the outfit layer 3 can substantially equal the rate of length shortening due to the air bag expansion. As a result, the present invention can prevent the issue of surface wrinkles on the outfit layer 3 when fixing the first transverse sealing edge 10 and second transverse sealing edge 11, which may occur due to the length difference caused by the shortening of the inflated film layer 1 in relation to the outfit layer 3.

Figure 11A:
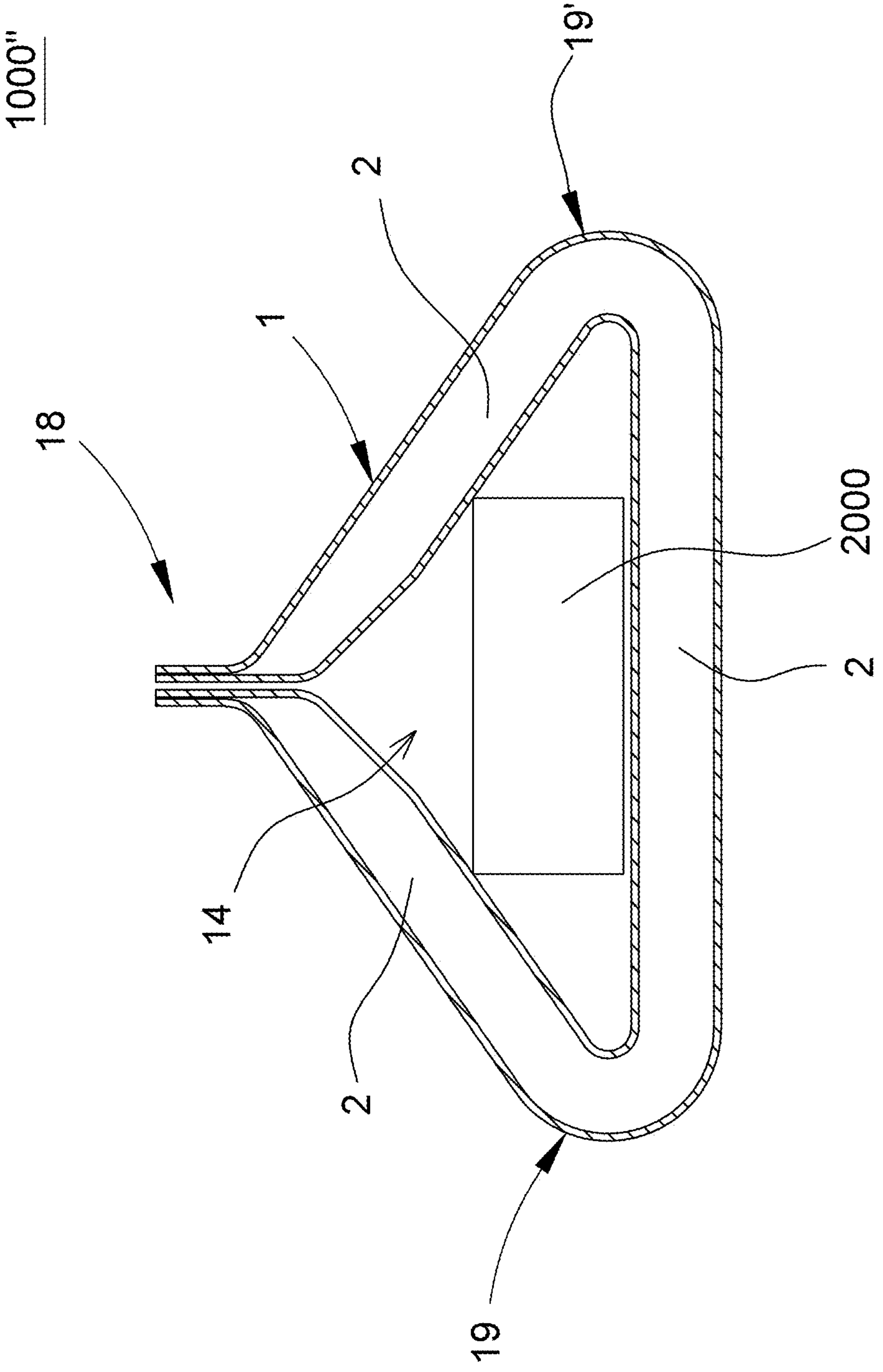
FIG. 11A is a sectional schematic diagram of a packing bag according to another embodiment of the present invention.
Figure 11B:
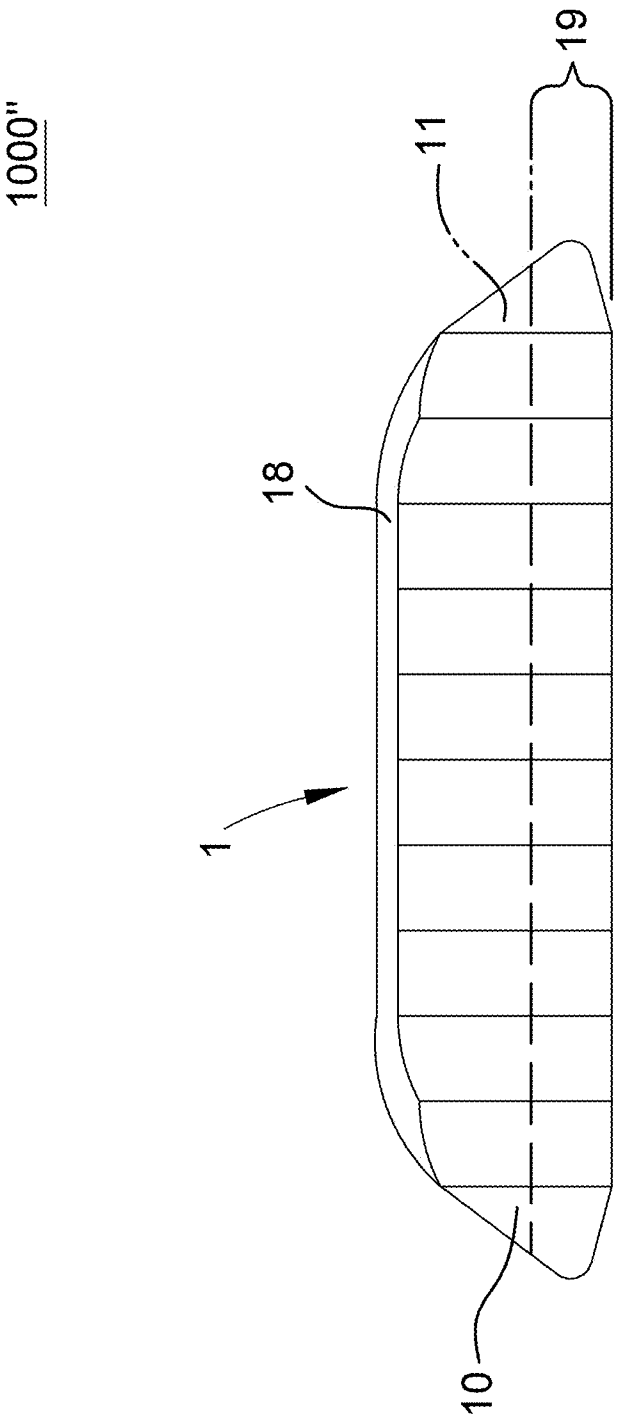
FIG. 11B is a side schematic view of the packing bag according to another embodiment of the present invention.

Please refer to FIG. 11A and FIG. 11B. FIG. 11A is a sectional schematic diagram of a packing bag 1000" according to another embodiment of the present invention. FIG. 11B is a side schematic view of the packing bag 1000" according to another embodiment of the present invention. The main difference between the packing bag 1000" and the aforementioned packing bag 1000 is that the film layer 1 of the packing bag 1000" has a first transverse sealing edge 10, a second transverse sealing edge 11, a longitudinal lug sealing edge 18, a first folding portion 19, and a second folding portion 19'. The first transverse sealing edge 10 is opposite to the second transverse sealing edge 11, while the first folding portion 19 is opposite to the second folding portion 19'. The longitudinal lug sealing edge 18 connects the first transverse sealing edge 10 and the second transverse sealing edge 11 and is located between the first folding portion 19 and the second folding portion 19'. Together, the first transverse sealing edge 10, the second transverse sealing edge 11, the longitudinal lug sealing edge 18, the first folding portion 19, and the second folding portion 19' form the accommodating space 14, which is designed to hold the object 2000.

Figure 12A:
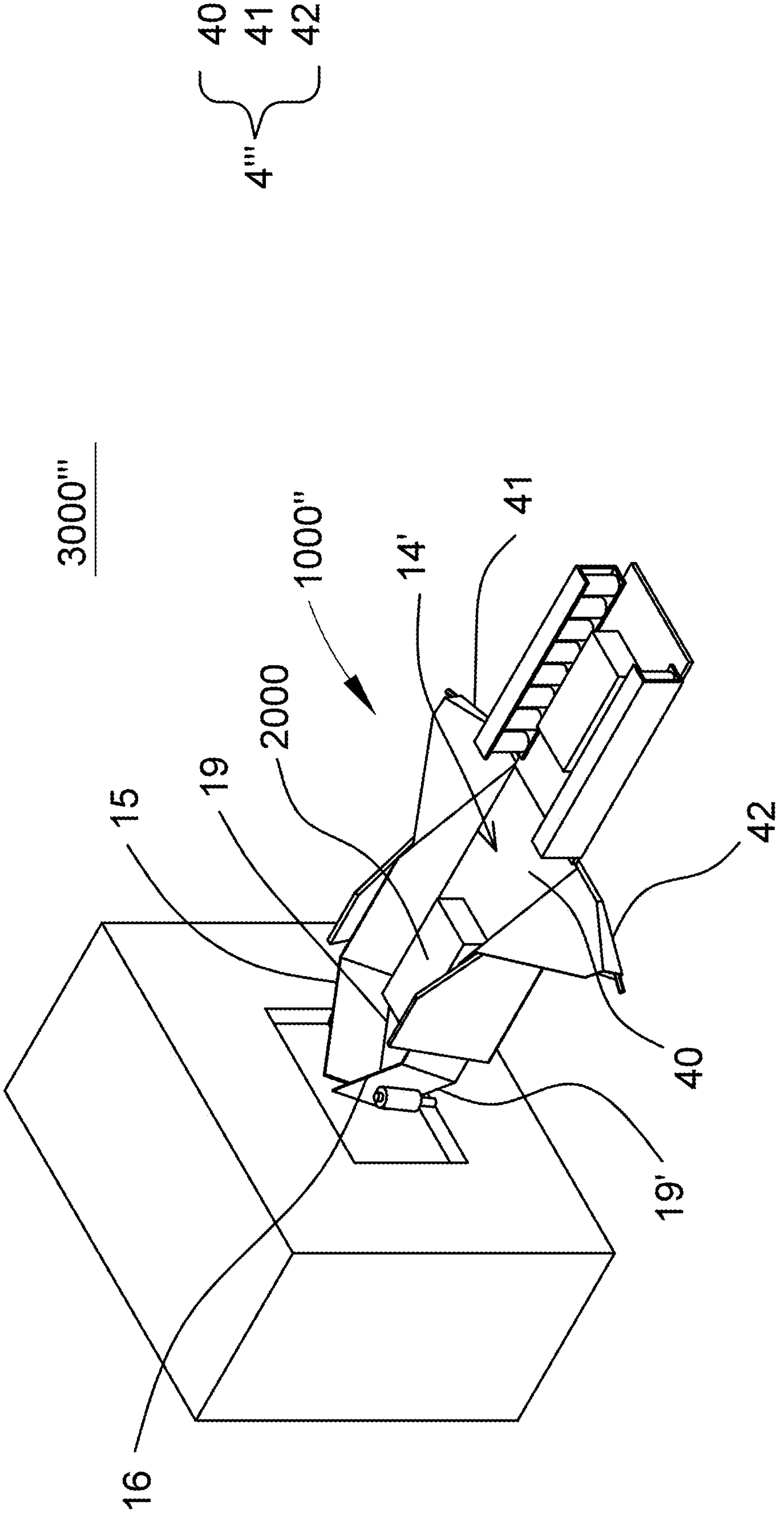
FIG. 12A is a schematic diagram of an automated production apparatus according to another embodiment of the present invention.
Figure 12B:
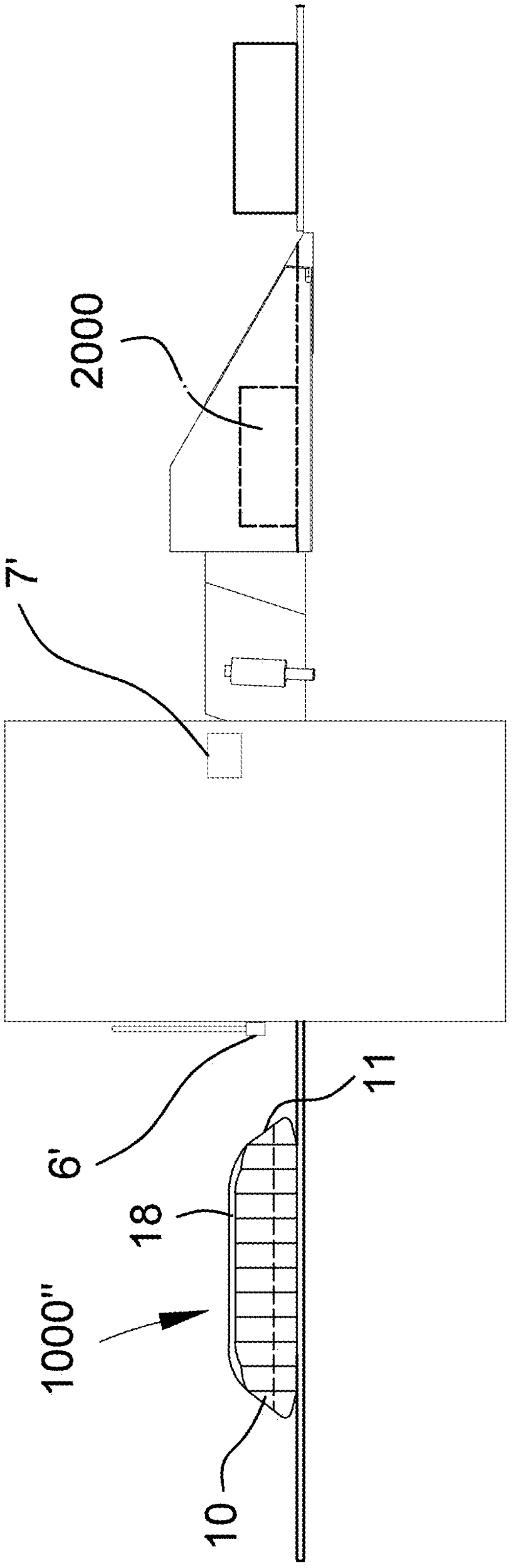
FIG. 12B is a side schematic view of the automated production apparatus according to another embodiment of the present invention.

Please refer to FIG. 12A and FIG. 12B. FIG. 12A is a schematic diagram of an automated production apparatus 3000''' according to another embodiment of the present invention. FIG. 12B is a side schematic view of the automated production apparatus 3000" according to another embodiment of the present invention. The automated production apparatus 3000" is used to produce the packing bag 1000" shown in FIG. 11. The automated production apparatus 3000" includes a folding member 4", a longitudinal scaling portion 7', and a transverse sealing portion 6'. The folding member 4" includes a closing portion 40, a first collapse wing portion 41, and a second collapse wing portion 42. The first collapse wing portion 41 is connected to one side of the closing portion 40, while the second collapse wing portion 42 is connected to the opposite side of the closing portion 40 relative to the first collapse wing portion 41.

When the film layer 1 passes through the folding member 4", one side of the film layer 1 will go through the first collapse wing portion 41, which allows this side of the film layer 1 to form the first folding portion 19 of the packing bag 1000". Meanwhile, the other side of the film layer 1 will pass through the second collapse wing portion 42, which enables this other side of the film layer 1 to form the second folding portion 19' of the packing bag 1000". An intermediate portion connecting these two sides of the film layer 1 will pass through the closing portion 40, which causes the intermediate portion of the film layer 1 to form an accommodating space 14' to accommodate the object 2000. Additionally, the closing portion 40 causes the first film edge 15 and the second film edge 16 of the film layer 1 to align with each other.

Furthermore, the longitudinal sealing portion 7' is used to seal the overlapping first film edge 15 and the second film edge 16, forming a longitudinal lug sealing edge 18 for the film layer 1. After the first film edge 15 and the second film edge 16 are sealed by the longitudinal sealing portion 7', the transverse scaling portion 6' applies pressure and heat sealing to create the first transverse sealing edge 10 and second transverse sealing edge 11 of the film layer 1. As a result, the longitudinal lug sealing edge 18, the first film edge 15, and the second film edge 16 of the film layer 1 can enclose the object 2000 within the accommodating space 14.

Figure 13:
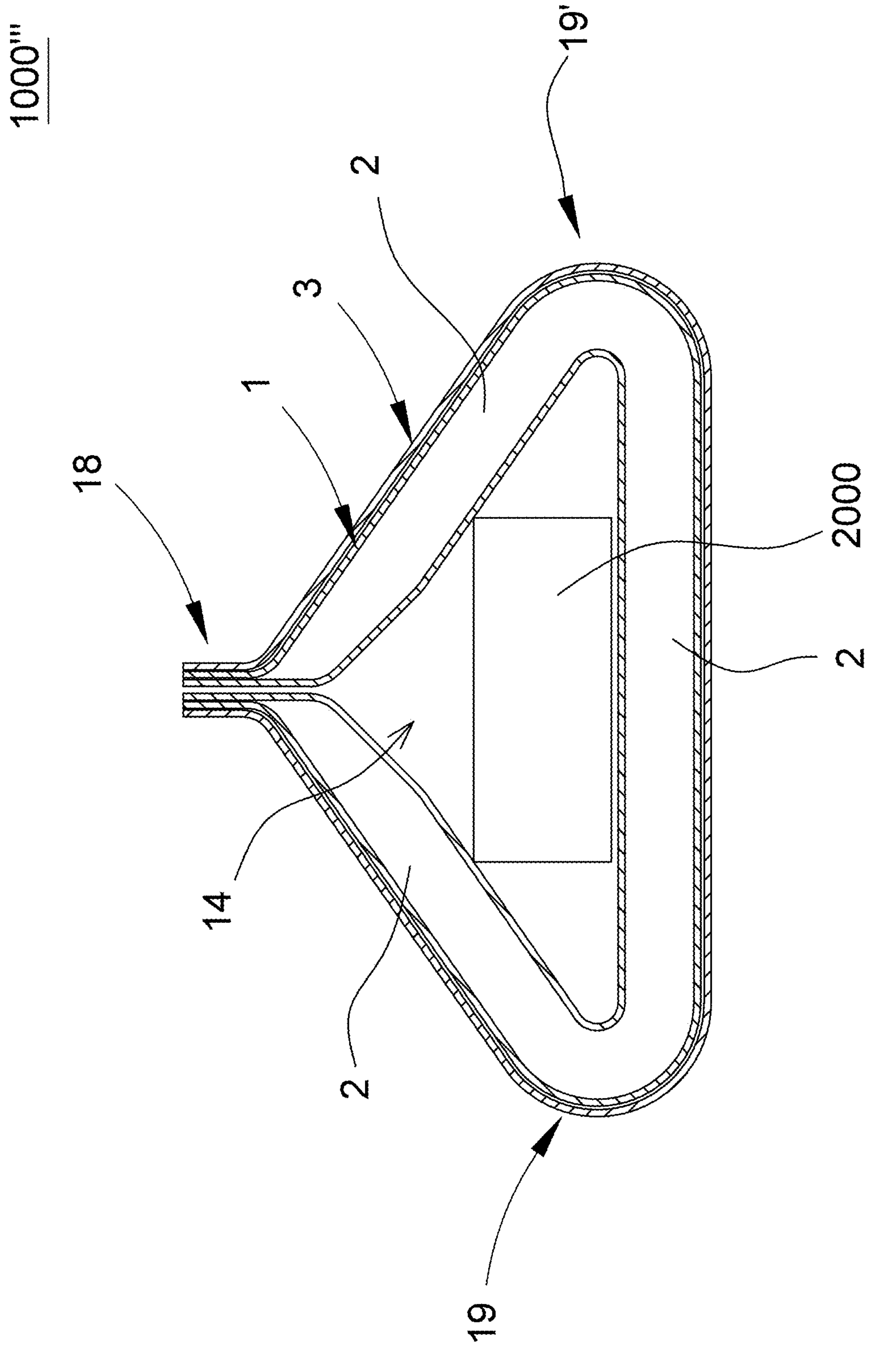
FIG. 13 is a schematic diagram of a packing bag according to another embodiment of the present invention.

FIG. 13 is a schematic diagram of a packing bag 1000''' according to another embodiment of the present invention. The main difference between the packing bag 1000" and the above-mentioned packing bag 1000" is that in this embodiment, the packing bag 1000" further includes an outfit layer 3, which covers the outer side of the film layer 1. The outfit layer 3 and the film layer 1 are jointly folded along the first folding portion 19 and second folding portion 19', allowing a first outfit edge and a second outfit edge of the outfit layer 3 to merge with the longitudinal lug sealing edge 18.

It is worth mentioning that packing bag 1000 or the packing bag 1000" may also include an identification component (not shown in figures), which can be disposed at least one of on the outer surface of film layer 1, on the inner surface opposite to the outer surface of film layer 1, in the accommodating space 14 and on the object 2000, depending on practical demands. In practice, the identification component could be a wireless radio frequency tag, a two-dimensional code (QR code), or a one-dimensional code (bar code). This identification component can be affixed to the outer or inner surface of film layer 1, on object 2000, or placed within the accommodating space 14. In this way, the identification component can provide identity identification information, enabling the packing bag 1000 or the packing bag 1000" to be identified, tracked, and logged during the logistics process. Alternatively, the identification component can also serve a theft prevention function; for example, when the packing bag 1000 or the packing bag 1000", which has an identification component with the identification component that has not been deactivated, passes through a reader, the reader can issue a warning, thereby achieving a theft prevention function. Additionally, since the identification component endows the packing bag 1000 or packing bag 1000" with an identification identity, it can be pre-set in a management system as permitted or not permitted for passage. Thus, when the packing bag 1000 or the packing bag 1000" with a permitted passage identification component passes through the reader, the management system judges the identification identity returned from the reading to be permitted for passage, and therefore the reader does not emit a warning. Conversely, when the packing bag 1000 or the packing bag 1000" without the permitted passage identification component passes through the reader, the management system judges the returned identification identity to be not permitted for passage, and consequently, the reader issues a warning, thereby achieving a theft prevention function.

It is worth mentioning that the packing bag 1000' or the packing bag 1000" may also include an identification component (not shown in figures), which can be disposed at least one of on the outer surface of the outfit layer 3, on the inner surface opposite the outer surface of the outfit layer 3, on the outer surface of film layer 1, on the inner surface opposite the outer surface of film layer 1, between the inner surface of the outfit layer 3 and the inner surface of film layer 1, in the accommodating space 14 and on the object 2000, depending on practical demands. In practice, the identification component could be a wireless radio frequency tag, a two-dimensional code (QR code), or a one-dimensional code (bar code). The identification component can be affixed to the outer or inner surface of the outfit layer 3, the outer or inner surface of film layer 1, on the object 2000, or placed between the inner surface of the outfit layer 3 and the inner surface of film layer 1, or within the accommodating space 14. In this way, the identification component can provide identity identification information, enabling the packing bag 1000' or the packing bag 1000" to be identified, tracked, and logged during the logistics process. Alternatively, the identification component can also serve a theft prevention function; for example, when the packing bag 1000' or the packing bag 1000" with the identification component that has not been deactivated passes through a reader, the reader can issue a warning, thereby achieving a theft prevention function. Additionally, since the identification component endows the packing bag 1000' or the packing bag 1000''' with an identification identity, it can be pre-set in a management system as permitted or not permitted for passage. Thus, when the packing bag 1000' or the packing bag 1000" with a permitted passage identification component passes through the reader, the management system determines that the identification identity returned from the reading is permitted for passage, and therefore the reader does not issue a warning. Conversely, when the packing bag 1000' or the packing bag 1000" without a permitted passage identification component passes through the reader, the management system determines that the returned identification identity is not permitted for passage, and consequently the reader issues a warning, thus achieving a theft prevention function.

Compared to the prior art, the folding member of the automated production apparatus of the present invention folds the film layer along the folding line, defining the opening between the second film edge and the first film edge. The opening member of the automated production apparatus of the present invention opens the opening between the second film edge and the first film edge to allow the object to be placed through the opening. The transverse sealing portion of the automated production apparatus of the present invention forms the first transverse sealing edge and the second transverse sealing edge on the film layer after being folded. Additionally, the longitudinal sealing portion of the automated production apparatus of the present invention forms the longitudinal sealing edge on the film layer after being folded. In this way, the invention utilizes the automated production apparatus for the automatically packaging of the object, saving packaging time. Furthermore, the packaging bag of the present invention may have an identification component, which can be used to provide an identification message, allowing the packing bag to be identified, tracked, and counted during the logistics process, or to generate anti-theft functionality.

The above description is merely a preferred embodiment of the present invention. Any equivalent structural variations that apply to the specification and claims of the present invention should be included within the scope of the patent for the present invention.

What is claimed is:

1. A packing bag, comprising:

a film layer having a first transverse sealing edge, a second transverse sealing edge, a longitudinal sealing edge and a folding line, the film layer being folded along the folding line, the longitudinal sealing edge being opposite to the folding line, the first transverse sealing edge being connected to the longitudinal sealing edge and the folding line, the second transverse sealing edge being connected to the longitudinal sealing edge and the folding line and opposite to the first transverse sealing edge, the first transverse sealing edge, the second transverse sealing edge, the longitudinal sealing edge and the folding line collectively forming an accommodating space, the accommodating space being for accommodating an object;

at least one airbag disposed on the film layer, the at least one airbag transitioning from a flat state to an inflated state by being inflated;

wherein the film layer further has a first film edge and a second film edge, after the film layer is folded along the folding line, the first film edge is corresponding to the second film edge and the first film edge and the second film edge define an opening, and the longitudinal sealing edge is for sealing the first film edge and the second film edge, so as to seal the opening; and wherein the second transverse sealing edge and the longitudinal sealing edge are formed after the first transverse sealing edge is formed and after the object has been placed into the accommodating space.

2. The packing bag of claim 1, wherein the first transverse sealing edge of the film layer is formed by a transverse sealing portion, the object enters the accommodating space through the opening, a part of the film layer near the first transverse sealing edge is driven by an activation mechanism when the object enters the accommodating space, such that the first film edge and the second film edge are collectively formed the longitudinal sealing edge by a longitudinal sealing portion.

3. The packing bag of claim 1, further comprising:

an outfit layer covering the film layer, the outfit layer having a first outfit edge and a second outfit edge, two sides of the outfit layer are respectively combined with the first transverse sealing edge and the second transverse sealing edge of the film layer, the outfit layer and the film layer are collectively folded by the folding line, such that the first outfit edge and the second outfit edge of the outfit layer are combined with the longitudinal sealing edge.

4. The packing bag of claim 3, wherein the film layer has a film outer surface and a film inner surface, the film inner surface defines the accommodating space, the film outer surface and the film inner surface are respectively located on opposite sides of the film layer, the outfit layer has an outfit outer surface and an outfit inner surface, the outfit outer surface faces the film inner surface, the outfit outer surface and the outfit inner surface are located on opposite sides of the outfit layer, the packing bag further comprises:

an identification component selectively disposed at least one of on the film outer surface, on the film inner surface, in the accommodating space, on the outfit outer surface, on the outfit inner surface, between the outfit inner surface and the film outer surface and on the object;

wherein the identification component is for providing an identification message.

5. The packing bag of claim 1, wherein the film layer has a film outer surface and a film inner surface, the film inner surface defines the accommodating space, the film outer surface and the film inner surface are respectively located on opposite sides of the film layer, the packing bag further comprises:

an identification component selectively disposed at least one of on the film outer surface, on the film inner surface, in the accommodating space and on the object;

wherein the identification component is for providing an identification message.

6. A packing bag, comprising:

a film layer having a first transverse sealing edge, a second transverse sealing edge, a longitudinal lug sealing edge, a first folding portion and a second folding portion, the first transverse sealing edge and the second transverse sealing edge being opposite to each other in a first horizontal direction and extending in a second horizontal direction perpendicular to the first horizontal direction, the first folding portion and the second folding portion being opposite to each other in the second horizontal direction and extending in the first horizontal direction; wherein the longitudinal lug sealing edge is connected to the first transverse sealing edge and the second transverse sealing edge, and located between the first folding portion and the second folding portion in the second horizontal direction; the first transverse sealing edge, the second transverse sealing edge, the longitudinal lug sealing edge, the first folding portion and the second folding portion are collectively forming an accommodating space; the accommodating space is for accommodating an object; and at least one airbag disposed on the film layer, the at least one airbag transitioning from a flat state to an inflated state by being inflated.

7. The packing bag of claim 6, wherein the film layer has a film outer surface and a film inner surface, the film inner surface defines the accommodating space, the film outer surface and the film inner surface are respectively located on opposite sides of the film layer, and the packing bag further comprises:

an identification component selectively disposed at least one of on the film outer surface, on the film inner surface, in the accommodating space and on the object, the identification component being for providing an identification message.

8. The packing bag of claim 6, further comprising:

an outfit layer covering the film layer, the outfit layer having a first outfit edge and a second outfit edge, the outfit layer and the film layer being folded along the first folding portion and the second folding portion, such that the first outfit edge and the second outfit layer are combined with the longitudinal lug sealing edge.

* * * * *